Patented Oct. 29, 1929

1,733,909

UNITED STATES PATENT OFFICE

GEORG SCHROETER, OF BERLIN, AND WALTHER SCHRAUTH, OF ROSSLAU, ANHALT, GERMANY, ASSIGNORS TO NEWPORT MANUFACTURING COMPANY, OF CARROLL-VILLE, WISCONSIN, A CORPORATION OF DELAWARE

HYDROGENATION OF NAPHTHALENE

No Drawing. Application filed August 29, 1921, Serial No. 496,640, and in Germany August 1, 1916.

(GRANTED UNDER THE PROVISIONS OF THE ACT OF MARCH 3, 1921, 41 STAT. L., 1313)

In a Patent No. 1,582,310 issued April 27, 1926, on an application filed contemporaneously herewith is described and claimed the hydrogenation of naphthalene, by a method involving the complete removal from the naphthalene of impurities which are capable of acting as catalyzer poisons, by treating the naphthalene in molten condition with various purifying agents including fuller's earth, animal charcoal, infusorial earth, metallic nickel, metallic iron, metallic sodium and metallic potassium.

In accordance with the present invention, it has now been found that compounds containing a metal loosely united to a non-acid component or residue can be employed as purifying agents, under the same conditions. It has also been found that the naphthalene may be purified by treatment with any of the above purifying agents (i. e., the metals, adsorbing agents or metal compounds), while the naphthalene is in a vaporized condition, and further that the hydrogenation of the naphthalene can conveniently be effected while the naphthalene is in a vaporized condition, by treatment with hydrogen in the presence of a catalyzer, such as nickel.

The following examples are given for the purpose of more fully explaining the invention:

*Example 1.*—100 kilos of crude naphthalene in the shape of the product obtained by warm pressing, are melted and vigorously stirred with 1 kilo of sodium amid in a kettle for three hours. The naphthalene is then distilled in vacuo. The product shows no red color nor rose coloration even after being mixed with strong sulfuric acid and allowed to stand for several hours, and is ready for hydrogenation by catalysis.

We have also discovered that the naphthalene can be effectively purified in an easy manner by treating it in the form of vapor with the above mentioned purifying agents, and especially with finely-divided easily melted metals, metallic alloys or such metal compounds as contain the metal only in loose combination with a non-acid component, either alone or in admixture with finely-divided porous materials. This purification is best effected by passing the naphthalene vapors from the distilling retort over several layers of the purifying agents mentioned or through washing liquids containing the purifying agents in a molten condition, this treatment being effected, if desired, in a washing tower.

In case the naphthalene contains considerable pitchy or non-volatile impurities, or materials which volatilize only at very high temperatures, these impurities will be found to remain in the distilling retort while the purifying agents take up and retain those substances in the naphthalene which are capable of acting as catalyzer poisons, and the naphthalene vapors coming from the purifiers can be condensed or can be passed directly, with hydrogen, into the catalytic apparatus for producing the hydrogenation. This mode of operation has the advantage of saving the second distillation of the preliminarily purified naphthalene, thereby effecting a marked economy of apparatus and fuel, and furthermore in a decided shortening of the time necessary for the purification of the naphthalene, as compared with the treatment in a molten condition.

*Example 2.*—100 kilos of naphthalene are placed in a distilling flask or boiler and heated under reduced atmospheric pressure sufficient to vaporize the same. The escaping vapors are passed through a washing receptacle filled with sodium or containing sodium and maintained at a temperature of about 150° C., (sodium being liquid at this temperature). The naphthalene vapor coming from the washing may be condensed and subsequently treated at temperatures above 100° C., with hydrogen in the presence of a nickel catalyzer.

For the production of tetrahydronaphthalene, it is necessary to separate the liquid product from the catalyzer when about 3 kilos of hydrogen have been absorbed (which may require a period of 1 to 2 hours). The catalyzer may thereby be left in the receptacle where it is available for the next hydrogenation.

*Example 3.*—100 kilos of naphthalene are brought to the distilling point in a distilling flask or boiler. The vapors are passed up through a column provided with finely-divided iron or nickel, which material may be used alone, or may be carried upon, or mixed with, finely-divided porous absorbent materials, such as fuller's earth. In place of this, a column can be used in which the melted metals (sodium or potassium or alloys containing these) are circulated by means of a pump. After passing through this apparatus, the naphthalene can be condensed and hydrogenated, for example by the processes described above or those described in the copending application above referred to.

*Example 4.*—Another mode of treatment which, in some cases, is highly advantageous is to dissolve the naphthalene in an organic solvent and treat the solution with the purifying agents above mentioned. Thus 100 kilos of commercial naphthalene are dissolved in about the same weight of tetrahydronaphthalene and stirred with about 1 kilo of sodium at 150 to 200° C. After 2 or 3 hours treatment, the product is distilled off from the residue or pressed out from the residue and the liquid can then be hydrogenated by the employment of the usual commercial catalyzers. After absorption of about 3 kilos of hydrogen, the entire mass will be found to be tetrahydronaphthalene. This may be separated from the catalyzer by filtration or distillation and the catalyzer can be reused for the hydrogenation of further quantities.

Other solvents besides the hydrogenation products of naphthalene can be employed and they can be recovered by fractional distillation from the hydrogenation products of naphthalene, for example, after the hydrogenation of the naphthalene is finished.

*Example 5.*—100 kilos of naphthalene are brought to the distilling temperature and the vapors are led into a washing apparatus containing melted sodium at a temperature of about 150° C. Naphthalene vapors, after passing through this washing apparatus, are condensed and hydrogenated with the employment of a nickel catalyzer at a temperature above 100° C., in the presence of hydrogen. If tetrahydronaphthalene is desired, the fluid product is separated when about 3 kilos of hydrogen have been absorbed, which will usually require from 1 to 2 hours.

*Example 6.*—100 kilos of naphthalene are distilled in vacuo, the naphthalene being conducted while still under reduced atmospheric pressure, through a columnar receiver containing finely-divided iron or nickel. This may, if desired, be used alone or may be mixed with finely-divided or porous materials such as fuller's earth. Instead of this receiver a column may be used in which fluid metals or alloys are circulated by means of a pump. After passing through this apparatus the purified naphthalene is ready for hydrogenation.

In Example 1, other compounds can be employed in place of the sodium amid, for example potassium amid, metal-ammonia compounds, metal carbids, such as those of aluminum or calcium, or metal compounds of acetylene. These may be generally classed as loosely combined compounds of metals with non-acid components.

In place of metallic sodium, in Examples 1, 2, 3, 4 and 5, other similar easily melted metals such as potassium or alloys of sodium or potassium (or both) can likewise be employed.

In place of fuller's earth, in Examples 1, 3 and 6, other materials can be used, such as infusorial earth, animal charcoal, argillaceous earth or other finely-divided porous material capable of absorbing or adsorbing the catalyzer poisons.

Attention is also directed to the fact that, as in the copending application above referred to, it is frequently advisable to employ two or more of the different classes of purifying agents referred to, either simultaneously or successively in any desired order.

In the present case, as in the copending case Serial No. 496,639 above referred to, the ordinary naphthalene before the purification contains impurities, such as coumarone, methyl derivatives of coumarone, and sulfur derivaties thereof, which produce a red coloration when treating the naphthalene with sulphuric acid. It is found that after the treatment of the naphthalene with the purifying agents, the same does not any longer produce the red coloration when treated with sulphuric acid.

In certain of the appended claims the term "expanded state" will be seen to include both dissolved material as well as material in the vaporized condition.

What is claimed is:

1. A process of producing hydrogenated naphthalene from naphthalene of ordinary commercial grade, which comprises vaporizing such naphthalene, subjecting the vaporized naphthalene to a treatment capable of removing those impurities which would cause a red coloration when treated with strong sulfuric acid and thereafter, without condensing the naphthalene from the vapor state, subjecting the same to the action of hydrogen in the presence of a hydrogenation catalyst.

2. A process of hydrogenating naphthalene which comprises the steps of removing from naphthalene, while in an expanded state, constituents capable of acting as catalyzer poisons and then subjecting the purified naphthalene, while still in expanded condition, to the action of hydrogen in the presence of a hydrogenation catalyst.

3. A process of hydrogenating naphthalene which comprises the steps of passing the naphthalene in the form of vapor in contact with a compound containing metal loosely bound to a non-acid residue to free the naphthalene of constituents capable of acting as catalyzer poisons and then subjecting the purified vapor to the action of hydrogen in the presence of a hydrogenation catalyst.

4. A process of hydrogenating naphthalene which comprises the steps of distilling the naphthalene, removing from the vapor those constituents which are capable of acting as catalyzer poisons and then subjecting the purified vapor to the action of hydrogen in the presence of a hydrogenation catalyst.

5. A process of hydrogenating naphthalene which comprises the steps of distilling the naphthalene at a temperature below that at which certain of its impurities volatilize, subjecting the vapor to the action of metallic agents capable of removing constitutents which, if retained, act as catalyzer poisons, and then subjecting the purified vapor to the action of hydrogen in the presence of a hydrogenation catalyst.

6. A process of hydrogenating naphthalene, which comprises the steps of dissolving the naphthalene in an organic solvent, removing from the product while at elevated temperature, constituents capable of acting as catalyzer poisons and subjecting the purified product, while still at elevated temperature, to the action of hydrogen in the presence a hydrogenation catalyst.

7. A process of hydrogenating naphthalene, which comprises the steps of subjecting naphthalene at elevated temperature to the action of a compound containing metal loosely bound to a non-acid residue to remove constituents capable of acting as catalyzer poisons and then subjecting the purified naphthalene while still at elevated temperature to the action of hydrogen in the presence of hydrogenation catalysts.

8. A process of hydrogenating naphthalene, which comprises removing from naphthalene while in vapor form, constituents capable of acting as catalyzer poisons and subjecting the purified naphthalene, while still at elevated temperature, to the action of hydrogen in the presence of a hydrogenation catalyst.

9. A process which comprises converting commercial naphthalene containing impurities capable of producing a red color when treated with sulfuric acid, into an expanded state, treating the naphthalene in such expanded state, with agents capable of removing the said impurities from the naphthalene, and then hydrogenating the naphthalene while still in the expanded state, by treating the same with hydrogen in the presence of a hydrogenation catalyst.

10. A process which comprises vaporizing the bulk of the naphthalene content of ordinary commercial naphthalene containing impurities which produce a red color on treatment with sulfuric acid, bringing the vapors of such naphthalene into contact with a purifying agent capable of removing the said impurities, such agent comprising a compound containing a metal united to a non acid substance, and thereafter, subjecting the vaporized naphthalene to the action of hydrogen in the presence of a hydrogenating catalyst, and maintaining the naphthalene in a vaporized condition, continuously during the said purifying and hydrogenating operations.

In testimony whereof we have signed our names to this specification.
GEORG SCHROETER.
WALTHER SCHRAUTH.